United States Patent [19]

Cox

[11] Patent Number: 4,873,834

[45] Date of Patent: Oct. 17, 1989

[54] COOLING PLANT LOAD REDUCTION APPARATUS AND METHOD

[76] Inventor: Doyle W. Cox, 309 Council Rd., Georgetown, Tex. 78628

[21] Appl. No.: 180,205

[22] Filed: Apr. 11, 1988

[51] Int. Cl.⁴ ............................................... F25B 9/00
[52] U.S. Cl. .......................................... 62/87; 62/119
[58] Field of Search .................... 62/87, 401, 402, 119

[56] References Cited
U.S. PATENT DOCUMENTS 4,209,998 7/1980 Shaw ........................................ 62/87
4,214,170 7/1980 Leonard ................................... 62/87
4,550,573 11/1985 Rannenberg ............................ 62/87

Primary Examiner—Ronald C. Capossela
Attorney, Agent, or Firm—J. Nevin Shaffer, Jr.

[57] ABSTRACT

A cooling plant load reduction mechanism utilizing "waste" heat for powering a rankine cycle device for the simultaneous additional cooling of a structure and production of electricity that substantially eliminates the need to purchase external power to run the device. Overall cost of producing cool air in a typical cooling process is thereby substantially reduced.

9 Claims, 1 Drawing Sheet 4,873,834

COOLING PLANT LOAD REDUCTION APPARATUS AND METHOD

BACKGROUND OF THE INVENTION

This invention relates to an improved apparatus and method for reducing the electrical and heat loads on a building cooling plant.

Air conditioning plants that are used to cool buildings and other structures by either central plants for individual buildings or for district cooling application, frequently used chilled liquids such as water or brine solutions to transfer cooling capacity from the central refrigeration plant to the remote chilling coils and air handlers that are located in or near the space to be cooled. The normal cooling plant usually consists of absorption chillers, steam jet evaporation refrigeration, or electrically driven compressor chillers or other drive combinations that produce chilled liquid, usually at a temperature range of 35 degrees fahrenheit to 45 degrees fahrenheit. This chilled liquid is then pumped through interconnecting pipes to each remote chill coil in the air handling unit serving the space to be cooled. The associated air handler blower, driven by a motor, gathers heat and moisture laden air from the space to be cooled and directs the air, which typically is about 75 degrees fahrenheit, through the chilled water heat exchanger, which is normally 35 degrees to 45 degrees fahrenheit. As a result, heat from the warmer 75 degree fahrenheit air from the air stream of the building is transferred to the cooler fluid at 35 degrees to 45 degrees fahrenheit in the chill liquid coil. Heat, therefore, is removed from the space in the liquid and directed by interconnecting pipes back to the central chilling plant at about 55 degress fahrenheit. Here the heat is removed from the chilled liquid by a known refrigeration process and once again chilled liquid, at about 35 degrees to 45 degrees fahrenheit, is recirculated to the air handler for continuous cooling as required.

In the normal system, air that has some heat removed by the chill water coil is directed to the building supply distribution ducts at about 55 degress fahrenheit to absorb more heat from the structure. Heat accumulates in structures as a result of solar gain or because of heat generated within the structure itself. For instance, individuals, by the physical process of converting food to energy, create body heat at 98.6 degrees fahrenheit, which is given up to the cooler building temperature of 75 degrees fahrenheit at an average rate of about 600 BTU/h per person. Additionally, heat is generated by the machinery within the building as well. In a structure which requires 1,000 ton/hours of cooling, the air handlers and chill coils recover or collect 12,000,000 BTU's each hour that the system is fully loaded. This is the heat equivalent of two barrels of oil at 6,000,000 BTU's each, every hour. In a district cooling plant for each 1,000 ton/hour of continuous load, this is the equivalent of 17,520 barrels of heating oil each year.

A drawback to the cooling systems for structures known in the art is that the waste heat of a building, solar gain, body heat and equipment heat, are continuously adding to the cooling load of a normal cooling plant. Thus, there is a need in the art for providing a cooling plant load reduction device which directly utilizes this waste heat. It, therefore, is an object of this invention to provide a cooling plant load reduction apparatus and method, for efficiently utilizing waste heat within a building to reduce the electrical and heat load on the normal cooling plant.

SHORT STATEMENT OF THE INVENTION

Accordingly, the cooling plant load reduction mechanism of the present invention includes a blower for collection and direction of heated air from within a structure. This blower is placed in front of an expansion system containing a coolant so that coolant, within the expansion system, absorbs heat from the heated air, i.e. waste heat, within the building thereby cooling the air leaving the expansion system and heating the coolant within the expansion system at the same time. The coolant from the expansion system is then directed to a turbine device so that the coolant, heated by the waste heat in the air from the blower, is allowed to expand and pass through the turbine device. The turbine device is mechanically connected to the blower and feed pump, powering the blower and feed pump and, therefore, eliminating the need for electricity to drive them and thereby reducing the electrical requirements of the invention. Further, an electrical generating device is connected to the turbine device so that as the coolant passes through the turbine, the generator produces electricity thereby reducing the electrical load of this system on the building and the electrical load on the building itself. Additionally, a condenser is provided which collects and cools the coolant from the turbine. Cooled coolant exiting from the condenser is pumped to the expansion systems so that coolant, under pressure, is delivered to the expansion systems and the cycle is allowed to repeat itself.

BRIEF DESCRIPTION OF THE DRAWINGS

Other objects, features and advantages of the present invention will become more fully apparent from the following detailed description of the preferred embodiment, the appended claims, and the accompanying drawings in which:

DETAILED DESCRIPTION OF THE PREFERRED EMBODIMENT

Figure 1:
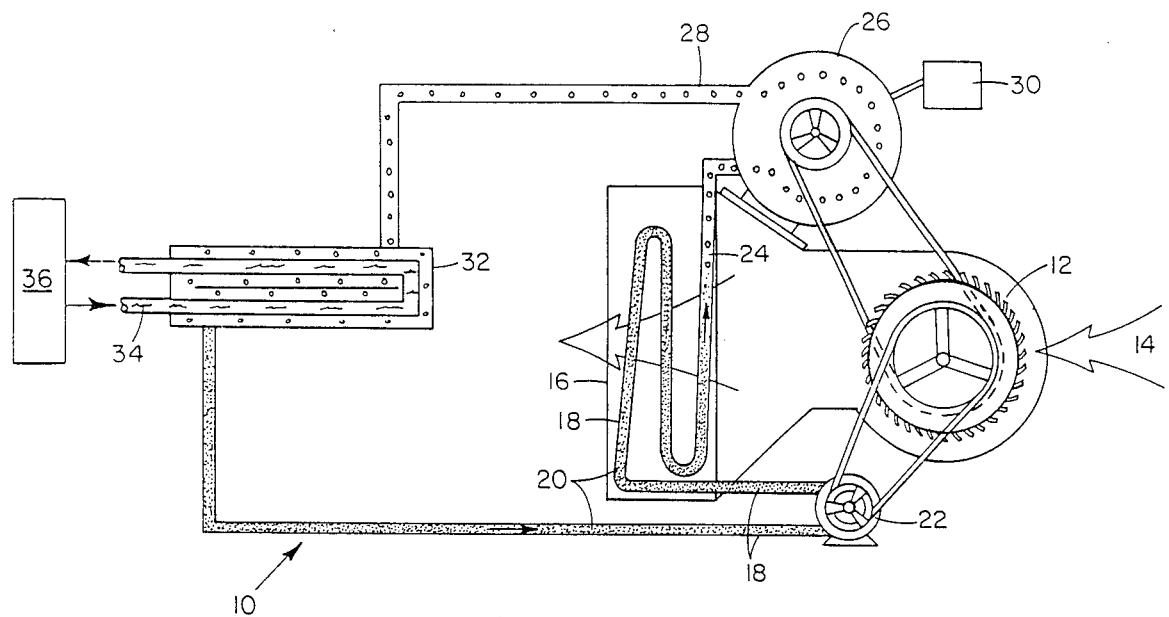
FIG. 1 is a schematic diagram illustrating the cooling plant load reduction mechanism of the present invention.
Figure 2:
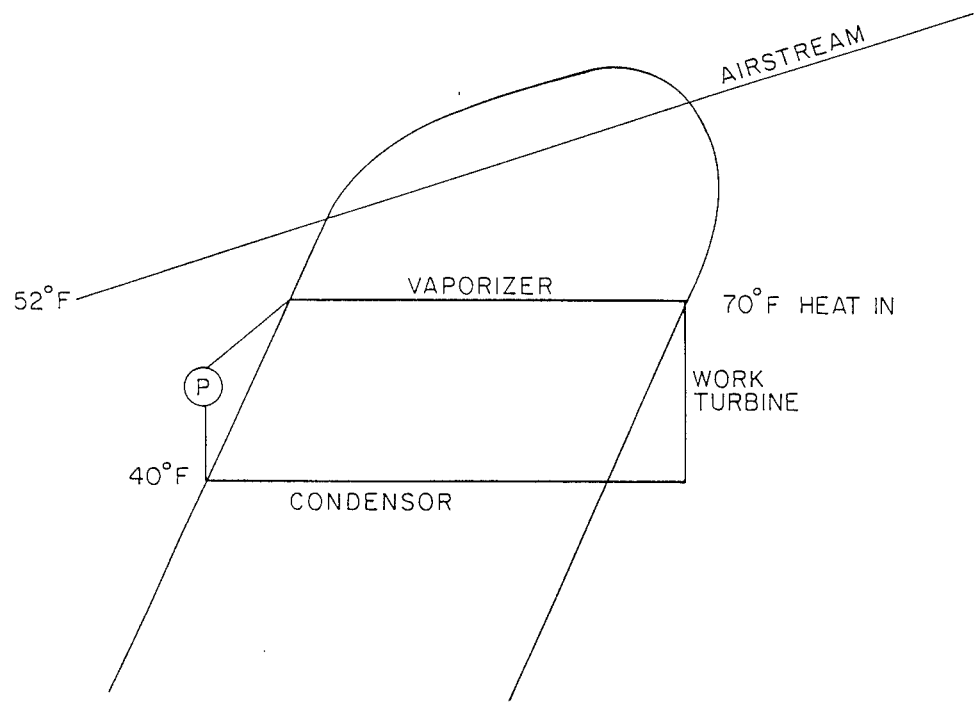
FIG. 2 is a schematic enthalpy diagram of the mechanism of the present invention.

The preferred embodiment of the present invention is illustrated by way of example in FIGS. 1 and 2. With specific reference to FIG. 1, the cooling plant load reduction device 10 is shown comprising blower 12, which collects returned air 14 from a building at approximately 75 degrees fahrenheit. Blower 12 directs this 75 degree return air to freon vaporizer/expansion device 16. Vaporizer 16 has piping 18 that contains liquid freon 20 under pressure from pump 22. Waste heat in return air 14 heats the liquid freon 20 under pressure in freon vaporizer 16 so that the liquid freon 20 is vaporized. Freon vapor 24 is then directed to turbine 26 where, because of lower pressure on the exhaust side 28 of turbine 26, freon vapor 24 is expanded. Turbine 26 is connected to generator 30 so that when freon vapor 24 passes through turbine 26 generator 30 produces electricity. Turbine 26 is also mechanically connected to blower 12 and liquid pump 22 and drives them.

Freon vapor 24, having left turbine 26 at the exhaust side 28 is then directed to condenser 32. Condenser 32 is maintained at a lower condensing temperature by utilization of chilled water 34 from a central chilling plant 36 (not shown) of a typical building cooling system.

In the typical design of a central cooling plant 36 known in the art, chilled water/liquid 34 leaves the cooling plant 36 at 35 to 40 degrees fahrenheit. This chilled water 34 is then typically pumped directly to an air handling unit and chill coil (not shown) where heat from return air stream 14 at 75 degrees fahrenheit would be directly by a blower, such as blower 12, to a coil (not shown) where heat is transferred to the chilled liquid. This is the system whereby the building air supply is cooled in the typical system. The net cooling effect of the air is proportional to the quantity and temperature rise of the liquid passing through the chill coil. In the typical case, the liquid, chilled water is at a temperature of 40 degrees entering and 55 degrees leaving.

As is known in the art, the fuel source to produce chilled liquid in the central chilling plant 36 and the power required to operate blower 12 may be made from fossil fuel, nuclear energy or the like. The intended purpose of the central cooling plants, known in the art, is to produce chilled liquid at a temperature low enough so that heat may be transferred from the higher temperature in the space to be cooled to the lower temperature of the chilled liquid so that heat may be removed from an area where it is not desired to an area where it is less objectional, i.e. outdoors.

The present invention better utilizes natural and recovered "waste" heat energy that is accumulated or generated within the structure to be cooled. As illustrated in this invention, the device may be assembled in the space to be cooled, consisting of freon vaporizer/expansion device 16, turbine 26, electrical generator 30, condenser 32, and feed pump 22. This invention then, takes advantage of the temperature difference between building return air 14 load at 75 degrees fahrenheit and the 40 degree fahrenheit chilled liquid 34 produced by central chilling plant 36 for the primary purpose of cooling the structure. As FIG. 1 indicates, the cooling plant load reduction device 10 of the present invention can transfer the same quantity of heat from building return air 14 at 75 degrees fahrenheit by means of blower 12 and pass return air 14 through freon vaporizer/expansion device 16 which causes liquid freon 20 to change phase to freon vapor 24 while the desired pressure is maintained by feed pump 22. Because of the enthalpy decrease experienced through turbine 26 as work energy is removed from the freon vapor 24 and transformed to shaft horsepower to do work on blower 12 and liquid pump 22 and electrical generator 30, the capacity requirements for chilled water/liquid 34 from central chilling plant 36 is reduced.

A key element of the novelty of this invention is the "host" arrangement of the structure of the invention within a building so that it takes advantage of the temperature drop between the building's return air 14 at 75 degrees fahrenheit and the chilled water 34, at about 40 degrees fahrenheit, supplied by the central chilling plant 36 which is produced by a separate fuel source for the purpose of cooling the structure. Utilization of the device of this invention provides for simultaneous additional cooling of the building and the production of electricity which may be used for purposes other than the production of cooling. Additional cooling is accomplished by removing the required volume heat energy from building return air 14, transferring this energy to the liquid freon 20 which results in freon vapor 24 which increases enthalpy and which is then directed to turbine 26 where enthalpy is decreased by work done to drive blower 12 and liquid pump 22 and produce electricity with generator 30.

Most importantly, the heat source that allows production of electricity with generator 30 and eliminates the requirements for electricity to drive blower 12 is what is known in the art as "waste" heat. That is, solar energy that is accumulated in the atmosphere within a structure and heat energy given off by the human body that is converted from food intake by the body and is absorbed into the cooler atmosphere of the structure at 75 degrees fahrenheit. These "waste" sources of heat may also include heat generated within a structure by electrical apparatus such as computers, motors and any other processes that require steam motivation, result in friction of mechanical parts within devices, etc. All of this "waste" heat is gathered in the return air 14 stream and transferred by blower 12 into freon vaporizer/expansion device 16 which contains liquid freon 20 under pressure by pump 22. Freon vapor 24 is directed from freon vaporizer 16 to the turbo expander, turbine 26, which forcefully drives generator 30 and blower 12 and liquid pump 22 and which, ultimately, converts the accumulated "waste" heat energy, such as solar heat, body heat and the like, that is generated within a structure, to electricity and shaft horsepower to drive blower 12 and liquid pump 22. Simultaneously, extra cooling is being produced. This cycle is completed by the direction of the freon vapor 24 from turbine 26 by means of exiting through the exhaust side 28 of turbine 26 to condenser 32 where sufficient heat is removed by chilled water 34 at approximately 40 degrees fahrenheit to allow condensation of freon vapor 24 into freon liquid 20 so that the liquid freon 20 can be recirculated by pump 22 back to freon vaporizer 16 to continue the cycle.

Referring now to FIG. 2, the physical properties of the invention are demonstrated by means of an enthalpy diagram. Starting at position number 1, the diagram demonstrates heat in equalling approximately 70 degrees with the source being the return air stream 14 handling a building load at 75 degrees fahrenheit. The descending vertical line from 1 to 2 illustrates the enthalpy drop of work done in turbine 26 as freon vapor 24 passes therethrough. The vertical line from number 2 to number 3 demonstrates the effect of the condenser 32 wherein reversible constant pressure heat transfer from vapor is shown ending in freon liquid 20. The connecting lines from number 3 to number 4 demonstrates work added by pump 22 to provide liquid freon 20 under pressure.

Finally, from number 4 to 1, the horizontal line demonstrates the reversible constant pressure heat transfer to liquid resulting in the transformation of liquid freon 20 to freon vapor 24.

Demonstration of the thermal efficiency of this cycle can be shown using the following mathematical equations.

$$(h1 = h2 + \text{work turbine (adiabatic process)}$$
$$(h2 - Q2 = h3)$$
$$(\text{work pump} = h4 - h3) \text{ (isentropic process)}$$
$$(h4 + Q1 = h1)$$

Thermal efficiency of the rankine cycle=network out divided by heat supplied.

$$e = \frac{wnet}{Q1} = \frac{wt - wp}{Q1\,Q - 1} = \frac{h1 - h2 - (h4 - h2)}{h1 - h4}$$

Therefore, work turbine (wt) is greater than work pump (wp) and by utilizing "waste" heat from return air 14, useful shaft work is done simultaneously while the central chilling plant 34 cools the building. Because heat out by condenser 32 (lines 2-3 in FIG. 2) is less than heat in (line 4-1 in FIG. 2) because of work removed by turbine (lines 1-2 in FIG. 2), less cooling capacity is required from central chilling plant 36 and the efficiency of central chilling plant 36 is thereby enhanced.

In summary then, the cooling plant load reduction device 10 of the present invention accomplishes its purposes by arranging a blower 12 for directing return air 14 to a heat exchanger, such as freon vaporizer 16, connected to a vapor expanding engine, such as turbine 26, which is connected to condenser 32 connected to liquid feed pump 22 which pumps liquid freon 20 back to the starting point and the heat exchanger of the air handling unit. This arrangement forms a closed loop section which is well know as a "rankine" cycle. The heat source for this "rankine" cycle, however, is "waste" heat absorbed from the air at approximately 75 degrees in the building space to be cooled. The "heat sink" for the condenser 32 of this cycle is provided by the lower temperature of the chilled liquid, chilled water 34, provided by the refrigeration part of the standard building air conditioning plant, central chilling plant 36. This chilled liquid, chilled water 34, is maintained, typically, at approximately 35 degrees fahrenheit. When motive fluids, such as refrigerant 502 and the like, are incorporated into this closed loop cycle, pressure drops are achieved at this stated temperature difference of 75 degrees to 40 degrees fahrenheit that is sufficient to substantially drive both blower 12 and liquid feed pump 22. This then, substantially eliminates the need to purchase external energy sources to operate the air handling unit of the present invention. As a result, the operating cost of providing air conditioning is reduced. This cost is reduced again by this invention because of the decrease in entropy associated with the drop of pressure through the turbine 26 that drives the blower 12 and liquid feed pump 22. This is true because in a rankine cycle, the heat out of a turbine or expander equals the heat in minus work done by the turbine.

While the present invention has been disclosed in connection with the preferred embodiment thereof, it should be understood that there may be other embodiments which fall within the spirit and scope of the invention as defined by the following claims.

What is claimed is:

1. A cooling plant load reduction apparatus comprising:
  A. a blower means for collection and direction of heated air from within a structure;
  B. an expansion means, containing a coolant means, located in the path of said heated air directed from said blower means whereby said coolant absorbs heat from said heated air and air leaving said expansion means is cooler than said heated air entering;
  C. a turbine means, mechanically connected to said blower means and a pump means, connected to said expansion means so that said coolant means, heated by said heated air, is passed through said turbine means;
  D. a generator means connected to said turbine means so that as said coolant means passed through said turbine means said generator produces electricity;
  E. a condenser means which collect and cools said coolant means from said turbine means; and
  F. said pump means for directing said coolant means from said condenser means to said expansion means under pressure so that heat and electrical loads within said structure are reduced.

2. The apparatus of claim 1 wherein said condenser means further comprises a chilled liquid that enters said condenser means at one temperature, absorbs heat from and cools said coolant means, and exits said condenser means with said absorbed heat.

3. The apparatus of claim 2 wherein said heated air is a by product produced naturally by solar gain and heat generated from within said structure.

4. A cooling plant load reduction apparatus comprising:
  A. a blower means for collection and direction of heated air from within a structure;
  B. an expansion means, containing a coolant means, located in the path of said heated air directed from said blower means whereby said coolant absorbs heat from said heated air and air leaving said expansion means is cooler than said heated air entering;
  C. a turbine means, mechanically connected to said blower means and a pump means, connected to said expansion means so that said coolant means, heated by said heated air, is passed through said turbine means;
  D. a generator means connected to said turbine means so that as said coolant means passed through said turbine means said generator produces electricity;
  E. a condenser means which collect and cools said coolant means from said turbine means;
  F. said pump means for directing said coolant means from said condenser means to said expansion means under pressure so that heat and electrical loads within said structure are reduced;
  G. a condenser means that comprises a chilled liquid means that enters said condenser means at one temperature, absorbs heat from and cools said coolant means, and exits said condenser means with said absorbed heat; and
  H. the apparatus wherein said heated air is a by product produced naturally by solar gain and heat generated from within said structure.

5. A cooling plant load reduction method comprising the steps of:
  A. placing an air blowing means in a building return air stream;
  B. collecting and directing heated air from said building, from said air stream by said air blowing means, to an expansion means, containing coolant means, so that said coolant means absorbs heat from said heated air and said heated air is cooled;
  C. connecting a turbine means to said expansion means, and to said air blowing means and a pump means, so that said coolant means heated by said heated air is passed through said turbine;
  D. connecting a generator means to said turbine so that as said coolant means passes through said turbine means said generator produces electricity;
  E. connecting a condenser means to said turbine means so that said coolant means is collected and cooled; and F. connecting said pump means to said condenser means so that coolant means is directed under pressure to said expansion means and so that heat and electrical loads on said building are reduced.

6. The method of claim 5, connecting said condenser means comprises the further step of introducing a chilled liquid means to said condenser that absorbs heat from and cools said coolant means and exits said condenser means with said absorbed heat.

7. The method of claim 6, wherein connecting said condenser means comprises the further step of connecting said condenser means to a central cooling plant from which said chilled liquid means is received and to which said chilled liquid is returned.

8. The method of claim 7, comprising the further step of utilizing heated air that is a by product of normal heat from solar gain and heat generated within said building.

9. A cooling plant load reduction method comprising the steps of:
   A. placing an air blowing means in a building return air stream;
   B. collecting and directing heated air from said building, from said air stream by said air blowing means, to an expansion means, containing coolant means, so that said coolant means absorbs heat from said heated air and said heated air is cooled;
   C. connecting a turbine means to said expansion means, and to said air blowing means and a pump means, so that said coolant means heated by said heated air is passed through said turbine;
   D. connecting a generator means to said turbine so that as said coolant means passes through said turbine means said generator produces electricity;
   E. connecting a condenser means to said turbine means so that said coolant means is collected and cooled;
   F. connecting said pump means to said condenser means so that coolant means is directed under pressure to said expansion means and so that heat and electrical loads on said building are reduced;
   G. connecting said condenser means comprises the further step of introducing a chilled liquid means to said condenser that absorbs heat from and cools said coolant means and exits said condenser means with said absorbed heat;
   H. connecting said condenser means comprises the further step of connecting said condenser means to a central cooling plant from which said chilled liquid means is received and to which said chilled liquid is returned; and
   I. utilizing heated air that is a by product of normal heat from solar gain and heat generated within said building.

* * * * *